United States Patent
Metzner et al.

(10) Patent No.: US 12,275,206 B2
(45) Date of Patent: Apr. 15, 2025

(54) MANUFACTURING METHOD AND SYSTEM FOR MANUFACTURING A CONTINUOUS FIBER REINFORCED COMPOSITE PART

(71) Applicants: Airbus Defence and Space GmbH, Taufkirchen (DE); Fundació Eurecat, Cerdanyola del Vallès (ES)

(72) Inventors: Christian Metzner, Taufkirchen (DE); Wolfgang Machunze, Taufkirchen (DE); Marc Crescenti, Cerdanyola del Vallès (ES)

(73) Assignees: Airbus Defence and Space GmbH, Taufkirchen (DE); Fundació Eurecat, Cerdanyola del Vallès (ES)

( * ) Notice: Subject to any disclaimer, the term of this patent is extended or adjusted under 35 U.S.C. 154(b) by 534 days.

(21) Appl. No.: 17/629,894

(22) PCT Filed: Jul. 23, 2020

(86) PCT No.: PCT/EP2020/070815
§ 371 (c)(1),
(2) Date: Jan. 25, 2022

(87) PCT Pub. No.: WO2021/013935
PCT Pub. Date: Jan. 28, 2021

(65) Prior Publication Data
US 2022/0250342 A1     Aug. 11, 2022

(30) Foreign Application Priority Data
Jul. 25, 2019   (EP) .................................... 19380014

(51) Int. Cl.
*B29C 70/68*     (2006.01)
*B29C 70/16*     (2006.01)
(Continued)

(52) U.S. Cl.
CPC .............. *B29C 70/68* (2013.01); *B29C 70/16* (2013.01); *B33Y 80/00* (2014.12);
(Continued)

(58) Field of Classification Search
None
See application file for complete search history.

(56) References Cited

U.S. PATENT DOCUMENTS

| 11,254,031 B2 | 2/2022 | Jessen et al. |
| 2014/0193192 A1 | 7/2014 | Eipper |

(Continued)

FOREIGN PATENT DOCUMENTS

| EP | 3231592 A1 | 10/2017 |
| JP | 2019509192 A | 4/2019 |
| WO | 2018203331 A1 | 11/2018 |

OTHER PUBLICATIONS

European Search Report; priority document, (Jan. 27, 2020).

*Primary Examiner* — Jacob T Minskey
*Assistant Examiner* — Adrianna N Konves
(74) *Attorney, Agent, or Firm* — Greer, Burns & Crain, Ltd.

(57) ABSTRACT

To achieve a composite material part with a fully load adapted 3D fiber reinforcement with low costs for tools and process, a method is provided for manufacturing a part made of composite material with a continuous fiber reinforcement. The method comprises the steps of providing a body with tubular cavities and having at least one first portion made from a first polymer material and at least one second portion made from a second polymer material, introducing resin and continuous fibers into the tubular cavities, and removing at least a part of the second polymer material.

8 Claims, 6 Drawing Sheets

(51) Int. Cl.
*B33Y 80/00* (2015.01)
*B29K 307/04* (2006.01)
*B29K 309/02* (2006.01)
*B29K 309/08* (2006.01)
*B29L 31/30* (2006.01)

(52) U.S. Cl.
CPC ...... *B29K 2307/04* (2013.01); *B29K 2309/02* (2013.01); *B29K 2309/08* (2013.01); *B29L 2031/3076* (2013.01)

(56) References Cited

U.S. PATENT DOCUMENTS

| | | |
|---|---|---|
| 2015/0190965 A1 | 7/2015 | Okamoto |
| 2017/0361497 A1 | 12/2017 | Crescenti Savall et al. |
| 2019/0105852 A1 | 4/2019 | Hoyle et al. |

MANUFACTURING METHOD AND SYSTEM FOR MANUFACTURING A CONTINUOUS FIBER REINFORCED COMPOSITE PART

CROSS-REFERENCES TO RELATED APPLICATIONS

This application claims the benefit of the International Application No. PCT/EP2020/070815, filed on Jul. 23, 2020, and of the European patent application No. 19380014.1 filed on Jul. 25, 2019, the entire disclosures of which are incorporated herein by way of reference.

FIELD OF THE INVENTION

The invention relates to a manufacturing method for manufacturing a part made of composite material with a continuous fiber reinforcement. Further, the invention relates to a manufacturing system for manufacturing a part made of composite material with a continuous fiber reinforcement.

BACKGROUND OF THE INVENTION 3D reinforced composite structures are more and more relevant for all future structural applications in vehicles and aircraft such as urban air vehicles, satellites, HAPS, NGWS/FCAS, drones or other carriers. Especially, load adapted 3D reinforced composite structures are generic enablers for loaded lightweight structures.

One possibility to achieve 3D reinforced composite structures is composite 3D printing of the whole reinforced composite part which is especially usable for a small-scale production. For a larger series production, manufacturing by thermobending and overmolding can be used with higher investments in manufacturing tools.

EP 3 231 592 A1 relates to a method for manufacturing a part made from composite material, having a body and one or more continuous fiber bundles in its interior, characterized in that it comprises the stages of:
a) obtaining a body that includes one or more tubular cavities in its interior that extend between a first end, disposed on the outer surface of the body and which comprises an inlet orifice, and a second end, opposite to the first end; b) introducing resin in the liquid state and a continuous fiber bundle in the interior of at least one tubular cavity through its inlet orifice; and c) curing the resin until it solidifies, adhering to the body and fixing the continuous fiber bundle. EP 3 231 592 A1 also relates to a system for manufacturing a part made from composite material and to the part made from composite material obtained.

SUMMARY OF THE INVENTION

An object of the invention is to enable manufacturing of more lightweight load adapted 3D reinforced composite material parts with lower tool and processing costs.

For achieving this object, the invention provides a manufacturing method, a manufacturing system and a composite material part obtainable therewith in accordance with the independent claims. Advantageous embodiments form the subject-matter of the dependent claims.

According to one aspect, the invention provides a manufacturing method for manufacturing a part made of composite material with a continuous fiber reinforcement, the method comprising the steps:

a) providing a body with tubular cavities and having at least one first portion made from a first polymer material and at least one second portion made from a second polymer material;
b) introducing resin and continuous fibers into the tubular cavities,
c) at least partially removing the second polymer material.

Step a) comprises:
a1) selecting the second polymer material from materials that are soluble in a solvent and the first polymer material from polymer materials that are non-soluble in said solvent.

Step c) comprises:
c1) dissolving the second material in the solvent.

Preferably, step c) comprises:
c2) removing the at least one second portion.

Preferably, step c) comprises:
c3) removing all the second material from the body.

Preferably, step a) comprises:
a2) additive layer manufacturing of the body.

Preferably, step a) comprises:
a3) designing the body with first portions defining openings of the cavities.

Preferably, step a) comprises:
a4) designing the body with first portions defining curvature portions of the cavities.

Preferably, step a) comprises:
a5) designing the body with first portions defining junction areas of the continuous fiber reinforcement.

Preferably, step a) comprises:
a6) designing the body with the at least one second portion defining middle sections of the tubular cavities.

Preferably, step a) comprises:
a7) designing the body with the at least one second portion defining straight sections of the tubular cavities.

Preferably, step a) comprises:
a8) designing the body with a larger amount of second material and a smaller amount of first material.

Preferably, at least 60% per weight, especially 70%-95% by weight, of the body are made from the second material.

Preferably, step a) comprises:
a9) designing the body with several first portions spaced apart from each other and connected by at least one second portion.

Preferably, step a) comprises:
a10) designing the body such that the at least one tubular cavity subsequently passes through the at least one first portion and the at least one second portion.

Preferably, step a) comprises:
a11) adding and/or connecting a metal member to the body such that the metal member has openings in alignment with open ends of the tubular cavities.

Preferably, step b) comprises:
b1) introducing the resin in a liquid state and a continuous fiber bundle simultaneously.

Preferably, step b) comprises:
b2) introducing a continuous fiber bundle within said at least one tubular cavity exerting on the continuous fibers a viscous drag force by means of a pressurized fluid or the resin, applying pressure differential.

Preferably, step b) comprises:
b3) introducing a continuous fiber bundle within said at least one tubular cavity exerting a mechanical pushing force on the bundle of continuous fibers.

Preferably, step b) comprises:
b4) introducing the resin and the continuous fibers sequentially, especially first the continuous fibers and subsequently the resin in a liquid state.

Preferably, step b) comprises:

b5) introducing reinforcing fibers, especially carbon fibers and/or a carbon fiber bundle.

Preferably, step b) comprises:

b6) introducing functional fibers, especially glass fibers and/or ceramic fibers.

Preferably, step b) comprises:

b7) introducing glass fibers for forming at least one thermal and/or strain gauge.

Preferably, step b) comprises:

b8) introducing ceramic fibers for forming at least one actuator. Especially, by introducing ceramic bundles for forming a fiber structure having piezoelectric properties, one or several piezoelectric actuators can be formed in the fiber structure.

Preferably, step b) comprises:

b9) curing the resin after introducing the resin and continuous fibers into the tubular cavities.

According to a further aspect, the invention provides a composite material part, obtainable by a manufacturing method according to any of the preceding embodiments.

Preferably, the composite material part is formed as a reinforcement fiber truss structure.

According to another aspect, the invention provides a manufacturing system for manufacturing a part made of composite material with a continuous fiber reinforcement, comprising:

an additive layer manufacturing device for additive layer manufacturing a body having at least a first portion from a first material which is non-soluble in a solvent and a second portion from a second material which is soluble in the solvent and at least one tubular cavity passing through the first and second portions;

a resin and fiber introduction device for introducing resin and continuous fibers into the at least one tubular cavity; and a dissolving device for dissolving the second material in the solvent.

According to another aspect, the invention provides a transport carrier or vehicle, especially a manned or unmanned aircraft or satellite, comprising a part obtained by a method according to any of the preceding embodiments and/or by using a manufacturing system according to the further aspect of the invention and/or a composite material part as described above.

The invention relates to the field of material science and especially to a manufacturing of 3D reinforced composite structures. Preferred use for such structures obtainable by embodiments of the invention are structural applications in transport carriers and vehicles and aircrafts such as urban air vehicles, satellites, HAPS, NGWS/FCAS, drones. More generally, parts obtainable by the invention are used as basis for loaded lightweight structures.

Embodiments of the invention especially use a continuous fiber injection process such as disclosed and described in EP 3 231 592 A1 which is incorporated herein by reference. Embodiments of the invention provide full 3D fiber reinforcements which are seen as a missing brick for lightweight parts and that are not manufacturable up to date.

Embodiments of the invention relate to a method for producing full 3d fiber reinforced polymer composite materials by means of 3d-printed soluble manufacturing tools.

The continuous fiber injection process has the advantage that 3D load adapted reinforced composite parts can be manufactured at low production costs with low investments in tools. Since fibers are injected with high pressure in tubular cavities in a polymer body, the body needs a polymer structure that can withstand these pressures. With the invention, it is possible to lower the weight of parts that are obtained by such a continuous fiber injection process.

Preferred embodiments of the invention have at least one, several or all of the following advantages:

It is possible to provide a carbon fiber UD (unidirectional) reinforcement with up to approximately 50× higher specific strength/modulus compared to high performance polymers including best resistance against creep, temperature/media, fatigue, etc.

Loads in structures are oriented in full 3d—technics with full 3d fiber orientation capability needed.

Beside load-carrying reinforcements, functional fibers can be integrated (such as glass fibers as thermal/strain gauges, ceramic fibers as actuators).

Preferred embodiments of the invention provide composite structures with low polymer ratio/mass, but ideal full 3d oriented reinforcement fibers with lowest tool and processing costs feasible.

The manufacturing method is ideal for low/medium rate series.

Preferred embodiments of the manufacturing system comprise especially technical means for producing full 3d composite structures.

According to a preferred embodiment a geometrical design of fiber reinforcement, polymer part material and soluble auxiliary/support material is provided.

The geometrical design is transferred into a process path (G-code), for example via slicer software.

The first material is especially a polymer part material (e.g., PEEK). The second material is especially a solvable support material (e.g., 3dGence ESM-10).

Preferably, liquid resin and reinforcement/functional fibers are provided.

Preferably, an ALM (Additive Layer Manufacturing) machine is used which is capable to process at minimum one part polymer material and one soluble material. Examples for such an ALM are FLM (Filament Layer Manufacturing) printers (available on market), modified HSS machines (HSS=High Speed Sintering; e.g., Binder Jetting with IR activation with an adapted ink) or adapted SLS machines with multi-material recoater (SLS=Selective Laser Sintering, especially feasible with two kind of materials, an example is the Aerosint re-coater, available from the company Aerosint).

Embodiments of the system further include a Fiber injection machine (CFIP) and, eventually, an oven—in case of hot curing thermoset resin. An example of a CFIP machine is shown and described in EP 3 231 592 A1, incorporated herein by reference.

Embodiments of the system further provide a solvent to dissolve the support material.

Preferred embodiments of the manufacturing method comprise the following steps:

1) Geometrical design of the fiber reinforcement, polymer part material (example of the first material) and surrounding auxiliary/support material (example of the second material).
2) Generation of the process path with conventual slicer software e.g., Simplify3d, Cura, Slic3r, . . . .
3) Printing of the first and second materials in one step with fiber paths integrated as open cavities, especially tubular cavities
4) Surface cleaning with subtractive processes (solvents, sandblasting milling, drilling, etc.) if needed 5) Injection of dry fibers with liquid resin in accordance with the CFIP process and device, e.g., as described and shown in EP 3 231 592 A1
6) Curing of thermoset resin in fiber reinforcements in oven if required
7) Dissolution of second material with subtractive technics and/or solvents (acids, water, etc.)
8) Finishing processes such as cutting fiber ends and/or cleaning of surface with sandblasting, milling, grinding, solvents or others if needed.

According to preferred embodiments a full 3d reinforced part with local polymer and load oriented "naked" fiber reinforcements is achieved.

BRIEF DESCRIPTION OF THE DRAWINGS

Preferred embodiments of the invention are described in more detail with reference to the accompanying drawings.

DETAILED DESCRIPTION OF THE PREFERRED EMBODIMENTS

Figure 1:
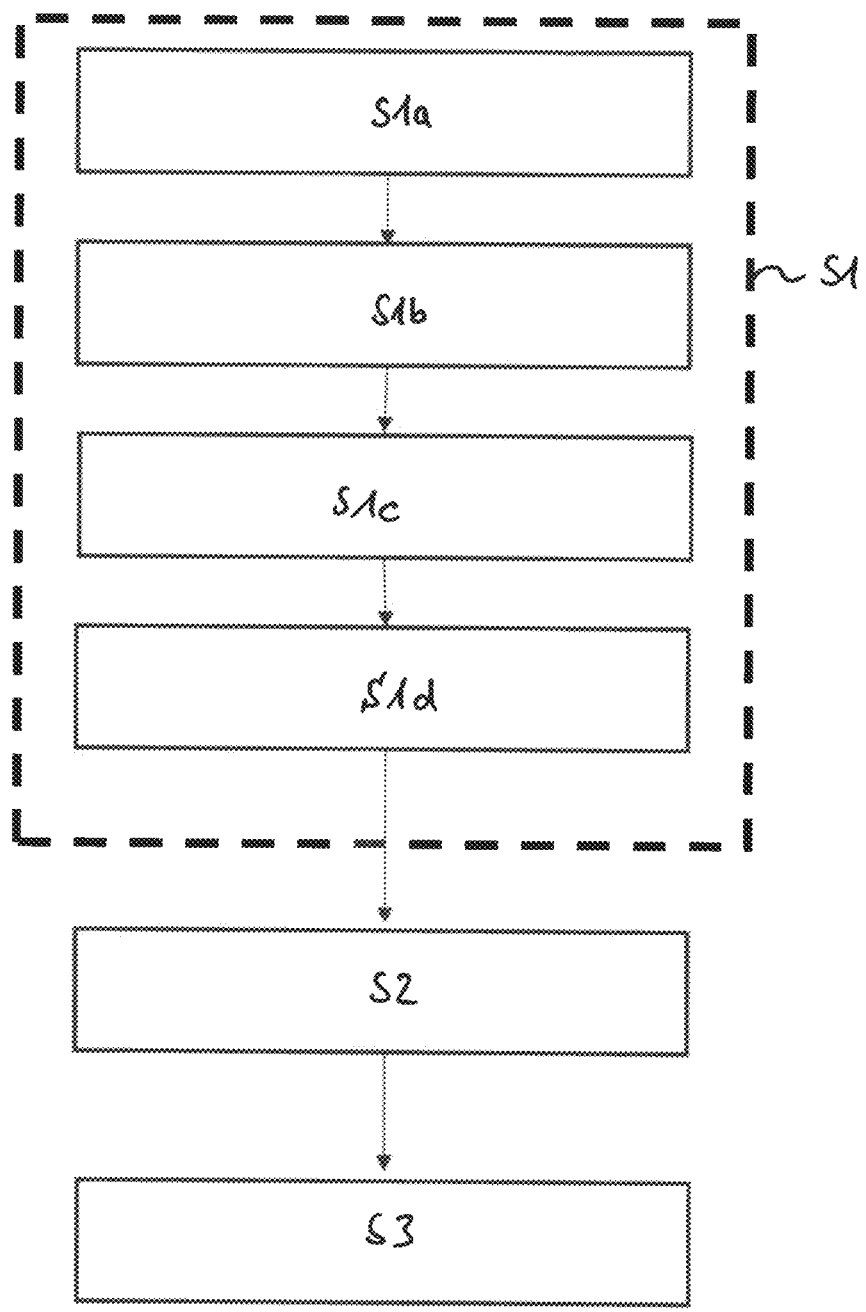
FIG. 1 is a flow chart of a method for manufacturing a part made of composite material with a continuous fiber reinforcement.
Figure 11:
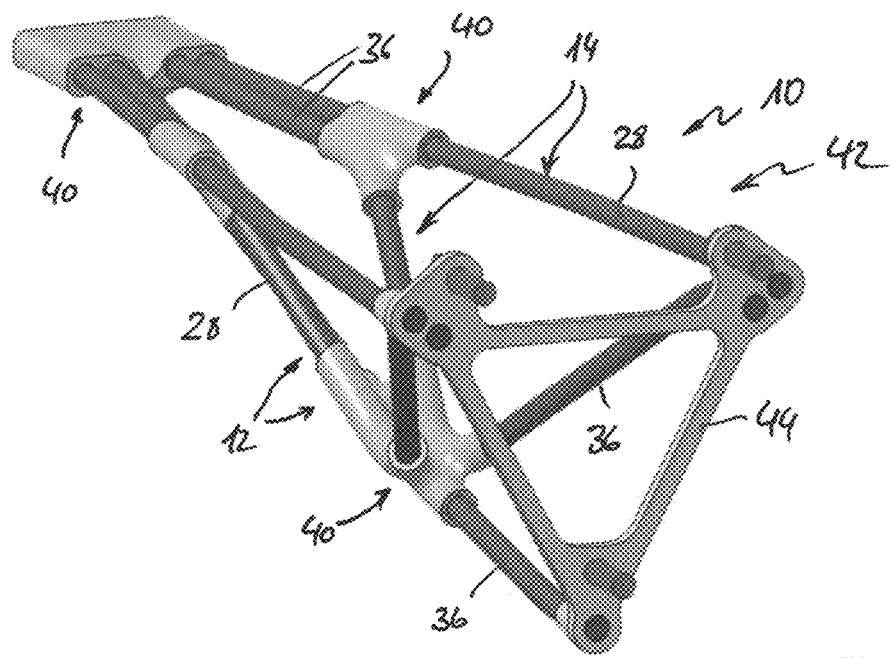
FIG. 11 shows a perspective view of the part manufactured with the method of FIG. 1 with the optional metallic member.
Figure 12:
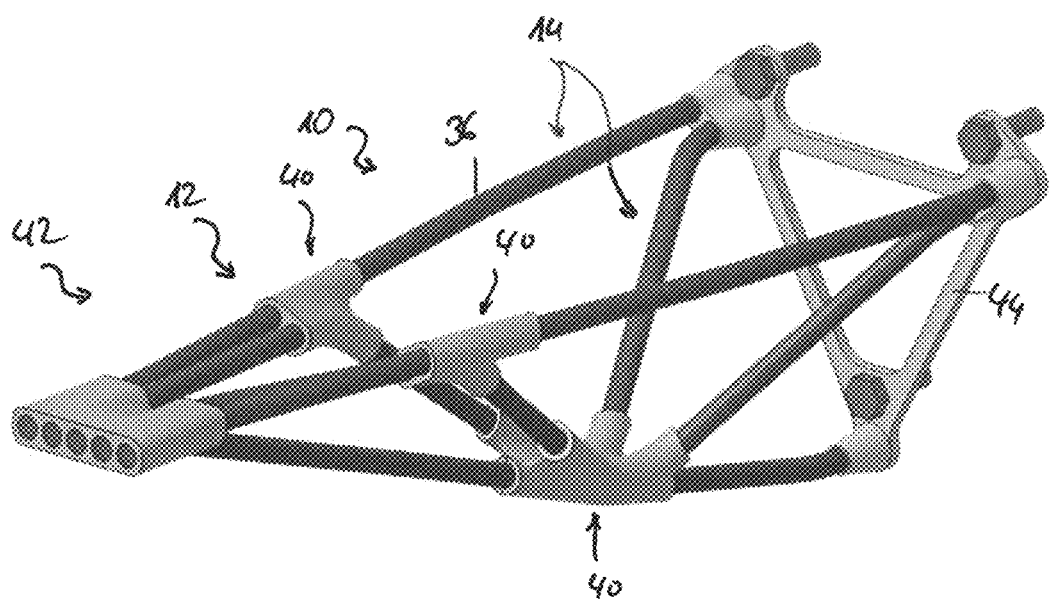
FIG. 12 shows a further perspective view of the part of FIG. 11.
Figure 13:
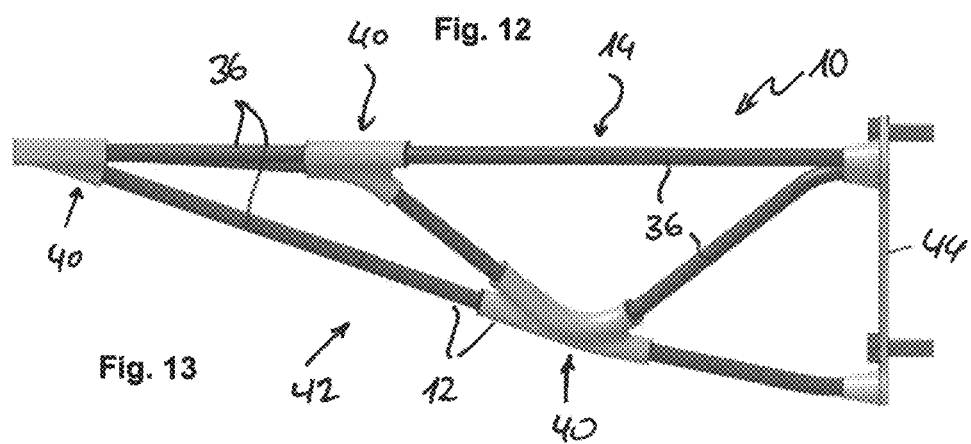
FIG. 13 shows a side view of the part of FIG. 11

FIG. 1 is a flow chart for a manufacturing method for manufacturing a part 10 made of a composite material 12 with a continuous fiber reinforcement 14. An example for such a part 10 obtained or obtainable by such method is shown in FIGS. 11 to 13.

Figure 2:
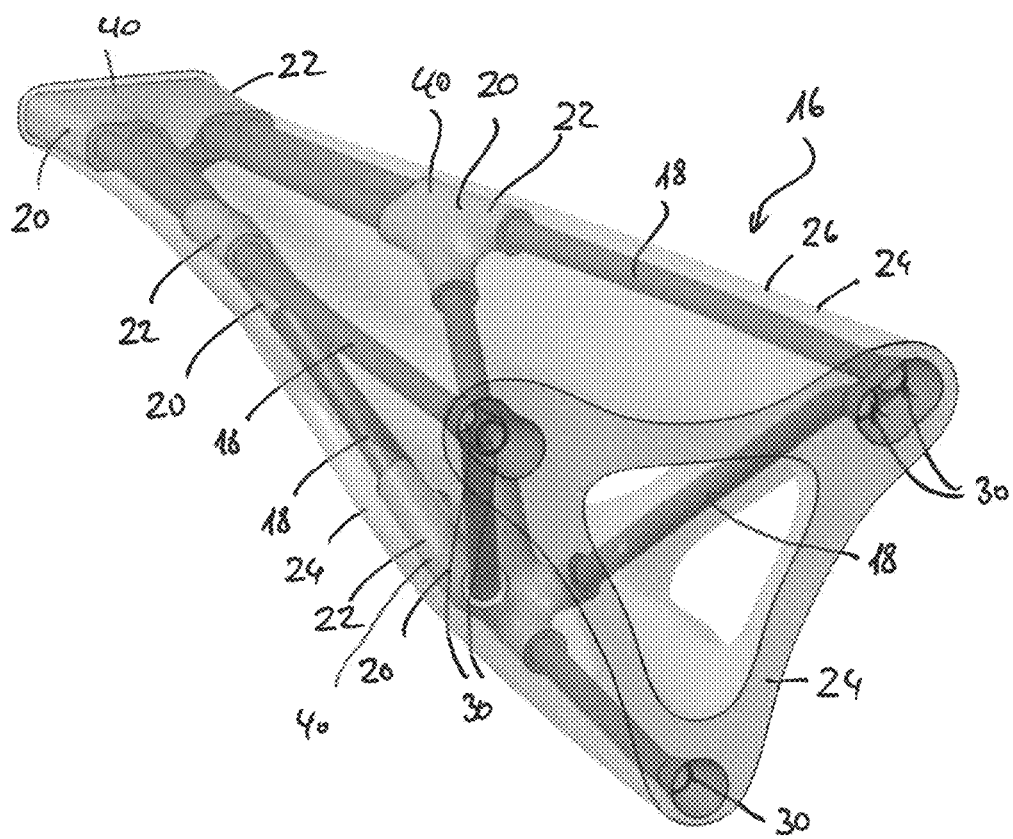
FIG. 2 shows a perspective view of a body which is obtained in a first step of the manufacturing method of FIG. 1.
Figure 3:
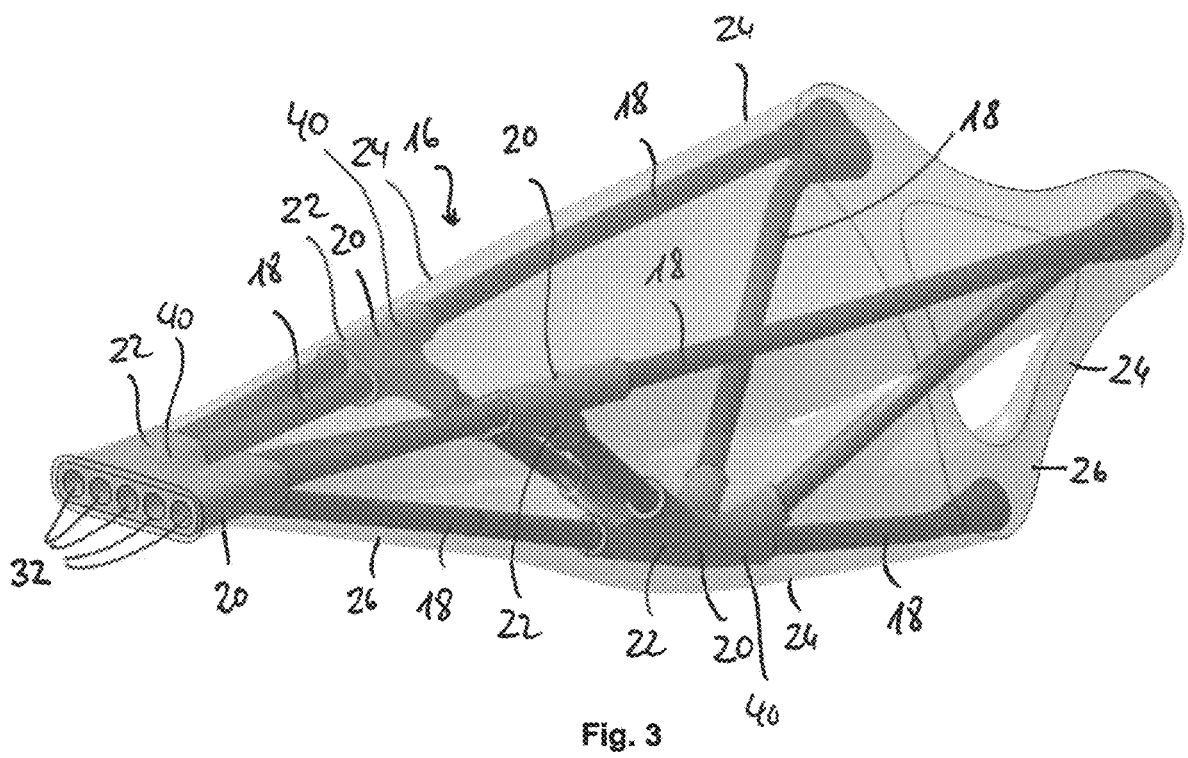
FIG. 3 shows a perspective view of the body of FIG. 2.
Figure 4:
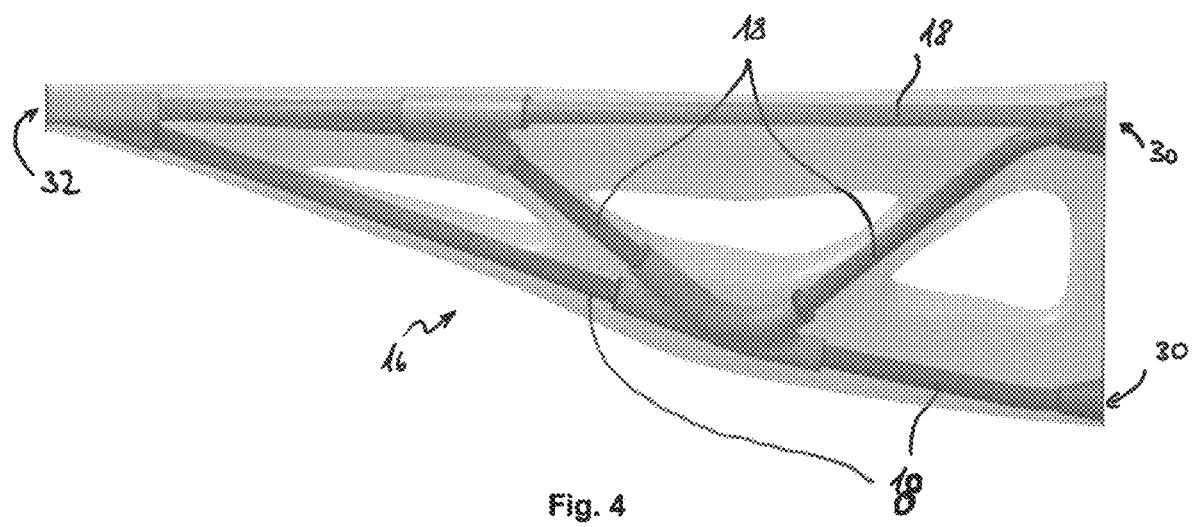
FIG. 4 shows a side view of the body of FIG. 2.

The method comprises a first step:

S1 providing a body 16—see FIGS. 2 to 4—with tubular cavities 18 and with at least one first portion 20 made from a first polymer material 22 and at least one second portion 24 made from a second polymer material 26.

Figure 9:
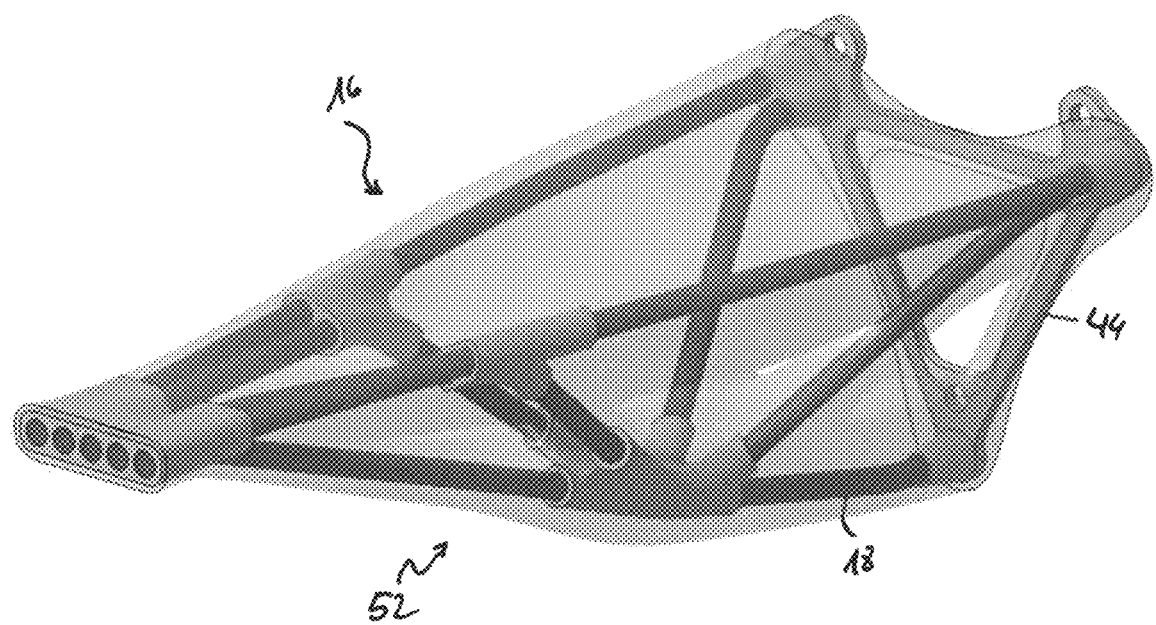
FIG. 9 shows a view similar to FIG. 7 after a further step of the manufacturing method wherein continuous fibers have been injected into the body.
Figure 10:
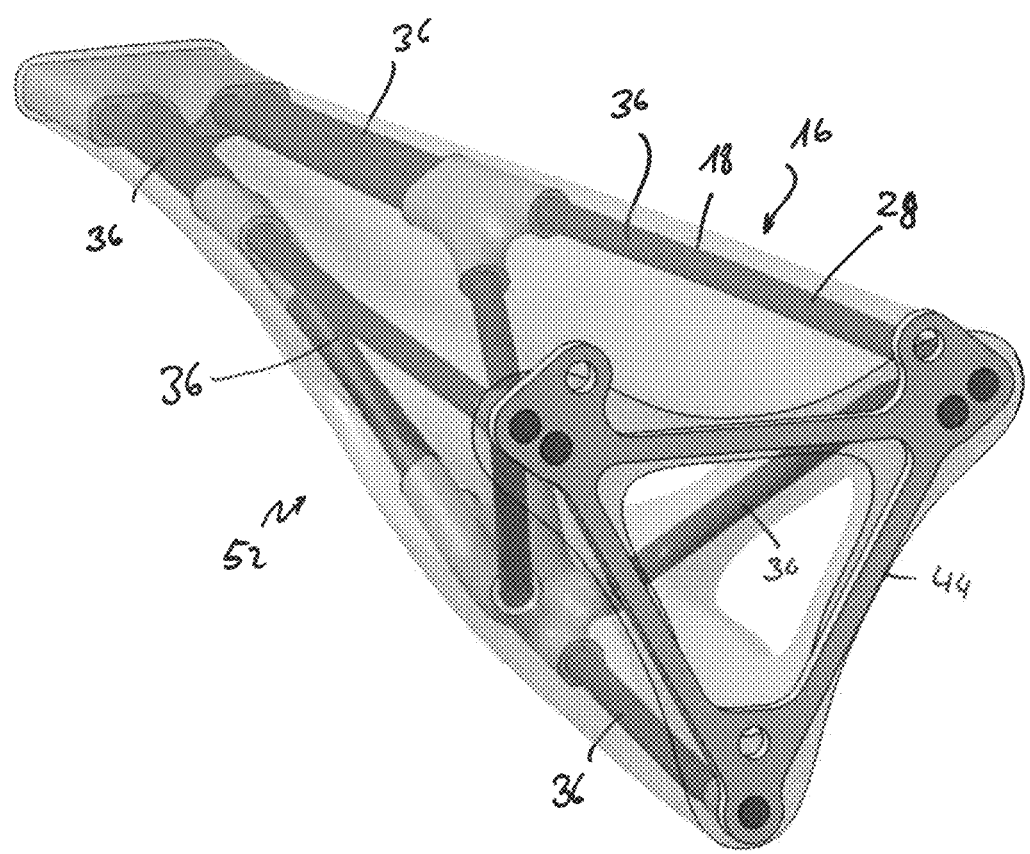
FIG. 10 shows another perspective view of the arrangement of FIG. 9 with the body, the metallic member and the continuous fibers injected into the body.

Further, the manufacturing method of FIG. 1 comprises a second step:

S2 introducing resin and continuous fibers 28—see FIGS. 9 and 10—into the tubular cavities 18 of the body 16.

Further, the manufacturing method of FIG. 1 comprises a third step:

S3 removing the at least one second portion 24.

In a preferred embodiment, the first step S1 comprises manufacturing of one or several tool parts containing tubular cavities 18 inside. Preferably, the second polymer material 26 is a soluble polymer which is soluble in a specific solvent, while the first polymer material 22 is a non-soluble polymer that is not soluble in the specific solvent. Most preferably, the body 16 is made by additive layer manufacturing with the non-soluble and soluble polymers 22, 26.

For manufacturing of the body 16, step S1 comprises a first sub-step:

S1a geometrical design of the fiber reinforcement 14 of the first polymer material 22 which shall be present in the part to be manufactured and of the second polymer material 26 which is only used as surrounding auxiliary or support material for the manufacturing of the part 10 and which is removed in step S3.

For example, the design is made with CAD software.

In the first sub-step S1a, the body 16 is preferably designed such that each tubular cavity 18 passes through the body 16 from a first open end 30 to a second open end 32.

In a preferred embodiment, the first portions 20 are designed such that first portions 20 are present in areas where the continuous fibers 28—which are injected in the second step S2 in the form of fiber bundles 36—form a curvature and/or in junction areas 40 of the part 10. In the junction areas 40, different fiber bundles 36 are close to each other. In the embodiment shown, the part 10 is a composite truss structure 42 with truss struts formed by the continuous fiber bundles 36 and truss nodes formed by the junction areas.

The at least one second portion 24 is present in all other areas of the body 16. Especially, the at least one second portion 24 forms the wall of the tubular cavities 18 in middle portions thereof and/or in straight sections thereof.

Most preferably, the tubular cavities 18 pass subsequently through a first portion 20 and a second portion 24. In preferred embodiments, at least one of the first and second open ends 30, 32 of a tubular cavity 18 is formed by a first portion 20.

Referring back to FIG. 1, the first step S1 of the manufacturing method further comprises a second sub-step:

S1b manufacturing the body 16 using an additive layer manufacturing machine (ALM machine—not shown).

Especially, the second sub-step S1b comprises generating of a process path with conventional slicer software such as Simplify3d Cura, Slic3r, . . . . Especially, the design obtained by the first sub-step S1a is converted in a machine-readable form that can be read and processed by an additive layer manufacturing machine.

As ALM machine, any ALM machine (also called 3D printer) can be used that is capable to process the first and second polymer materials 22, 26. The first and second polymer materials 22, 26 can be chosen as needed. In preferred embodiments, the materials 22, 26 are chosen such that the first polymer material 22 is not soluble by a solvent and the second material 26 is soluble by the solvent. For example, the second polymer material 26 is a material which is available on the market as soluble auxiliary material for supporting a 3D structure during printing and that can be removed afterwards. One example is 3dGence ESM-10. The first polymer material 22 is a polymer material which can be printed and which is not soluble by the solvent which is used to remove the second polymer material 26. One example is PEEK. Further examples are PE, PP, ABS, PETG, . . . .

Examples for the ALM machine are a FLM printer (available on the market), HS machines or SLS machines.

One example for a result of the second sub-step S1b is shown in FIGS. 2 to 4. It shows the body 16 with the tubular cavities 18 having the first open end 30 and second open end 32 and a complex path there between, wherein the first portions 20 made of the first polymer materials 22 are present to form the second open end 32, junction points or junction areas 40 and/or curvature sections of the tubular cavities 18. In an embodiment not shown, additional first portions 20 can also form the first open ends 30. In the embodiment as shown in the FIGS. 2 to 4, the first open ends 30 are provided within the second portion 24 which surrounds and connects several first portions 20 arranged spaced apart from each other.

One aim of the design of the body is to achieve a part with a very low polymer to reinforcement fiber ratio. Hence, the second material 26 to be removed in the third step and used as auxiliary material only is preferably the dominant material in the body 16. For example, the 60% per weight, especially 70 to 95% per weight of the body is made from the second material 26, and only the rest is made from the first material. Hence, the part 10 will contain only 5 to 40% of the polymer material of the body 16.

The body 16 is used as a tool to manufacture the part 10 which is shown in FIGS. 11 to 13. The second portion 24 acts as a form for the tubular cavities 18 in order to inject the continuous fibers 28.

Figure 5:
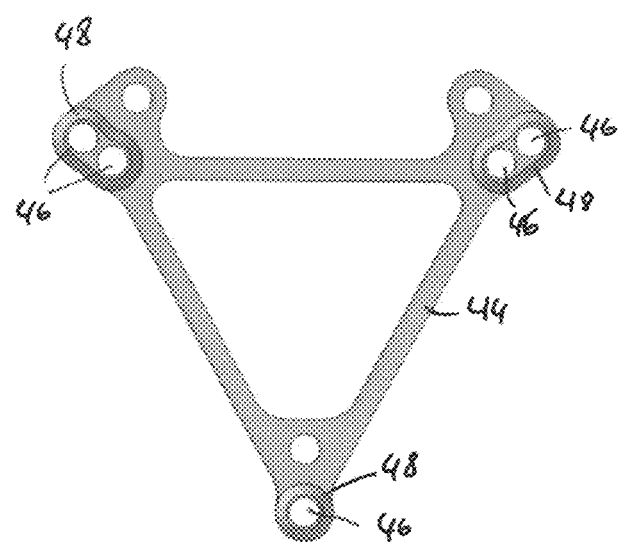
FIG. 5 shows a plan view of a metallic member which is optionally used in the method of FIG. 1.
Figure 6:
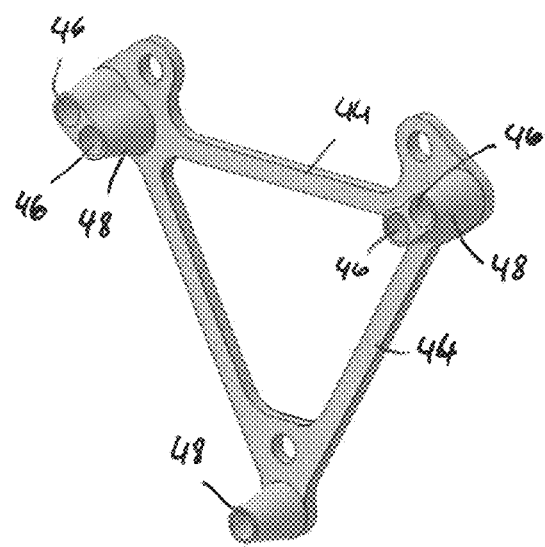
FIG. 6 shows a perspective view of the metallic member of FIG. 5.

In the embodiment shown, it is further possible to add a third material, for example, a metallic material. An example for a metallic member 44 is shown in FIGS. 5 and 6. The metallic member 44 has, on one side, a form that is complementary to one end of the body 16, especially complementary to one end of the second portion 24. The metallic member 44 has openings that can be aligned with the first open ends 30. The metallic member 44 can be attached to the end of the body 16 which has the first open ends 30 of the tubular cavities 18.

According to one example, the metallic member 44 has protruding portions 48 defining the openings 46 that can be engaged with recessed portions 50 of the second portion 24 defining the first open ends 30 of the tubular cavities 18.

Hence, referring back to FIG. 1, the first step S1 can optionally have the additional sub-steps:
S1c manufacturing a metallic member 44, and
S1d pre-assembling the body 16 and the metallic member 44.

In the third sub-step S1c, the metallic member 44 can, for example, be made by machining or other manufacturing technologies.

In one preferred embodiment of the fourth sub-step S1d, the pre-assembling is done with coincident tubular cavities 18, i.e., the opening 46 are in alignment with the first open ends 30 of the tubular cavities 18. The assembly can be done by different technologies. For example, the metallic member 44 and the body 16 can be attached to each other by positive engagement between the protruding portions 48 and the recessed portions 50. The different parts of the manufacturing tool 52, for example, the body 16 and the metallic member 44, can also be connected to each other, for example by gluing or bonding.

Figure 7:
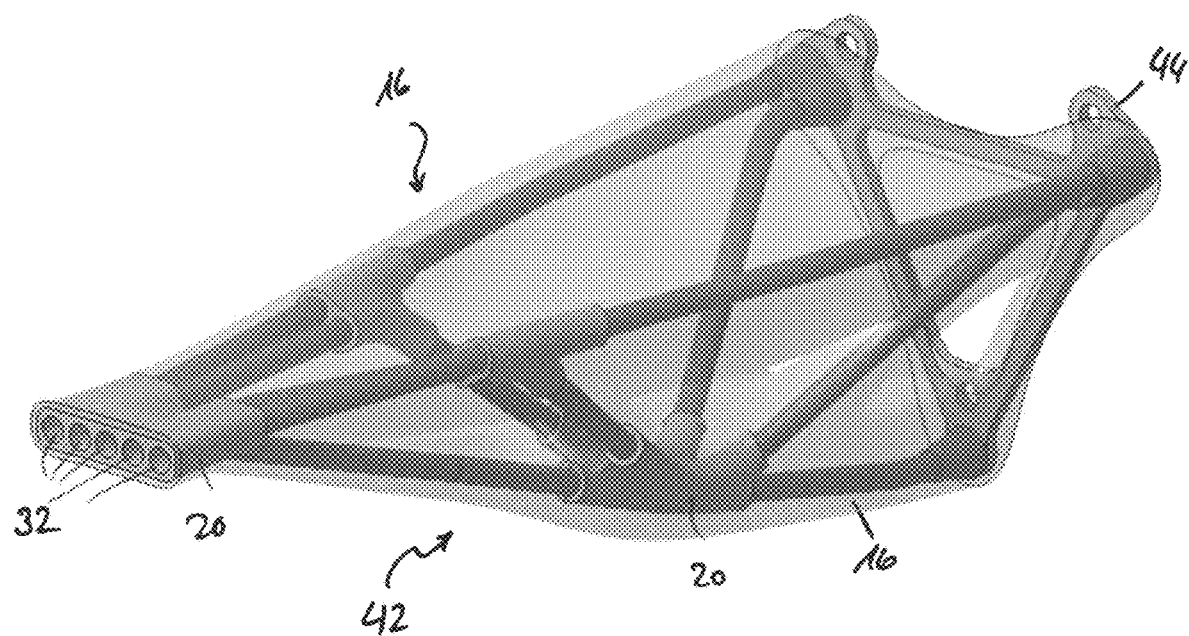
FIG. 7 shows a perspective view of the body of FIG. 2 with a metallic member of FIG. 5 attached thereto.
Figure 8:
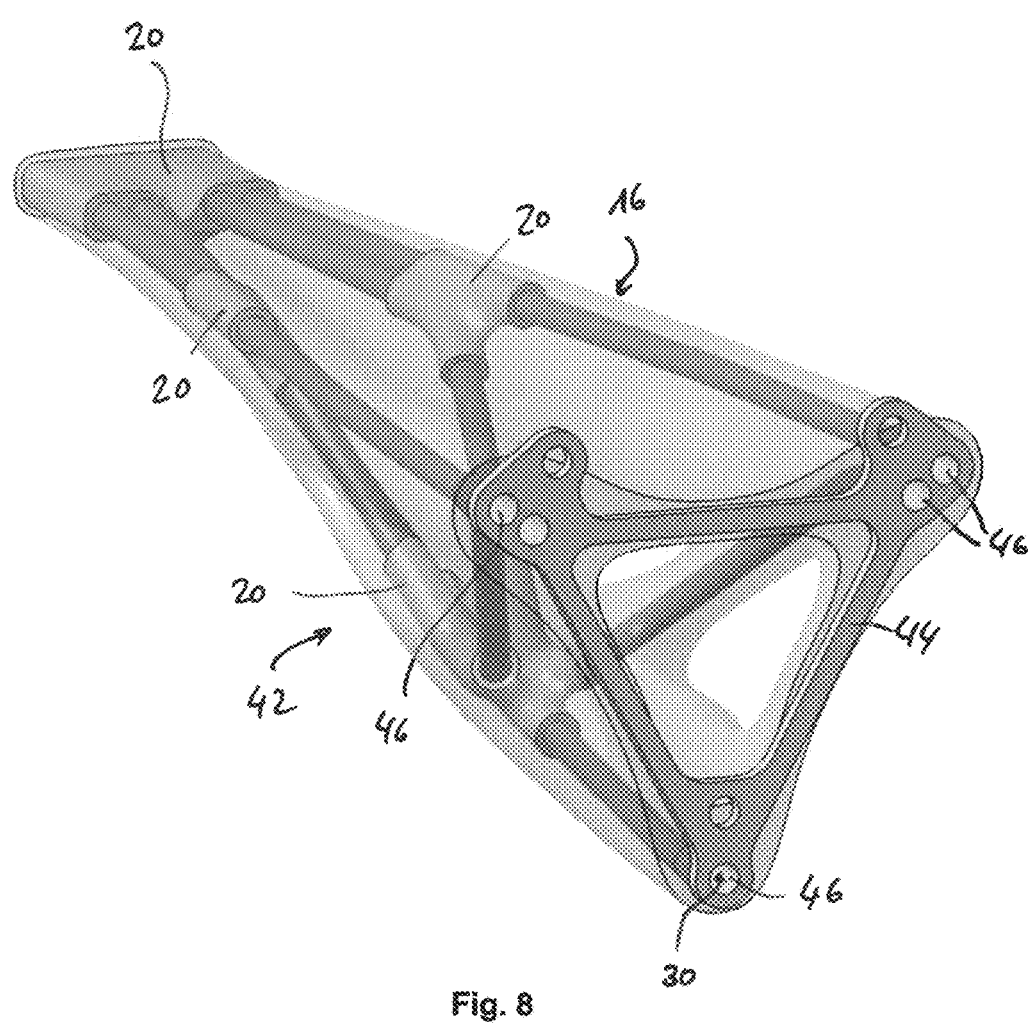
FIG. 8 shows a further perspective view of the arrangement of the body and the metallic member of FIG. 7.

Preferably, the manufacturing tool 52 is formed by an arrangement of the body 16 and a further member such as the metallic member 44 as shown in FIGS. 7 and 8.

After the fourth sub-step S1d of the first step S1, the second step S2 is conducted. In the second step S2, a continuous fiber injection process (CFIP) is conducted such as this is described in EP 3 231 592 A1. Preferably, the fibers bundles 36 are injected together with a liquid resin into the tubular cavities 18. This process is generally known from EP 3 231 592 A1 and is not described further herein. Especially, carbon fibers are injected with a thermoset resin. The fiber bundles 36 are then formed by the path of the tubular cavities 18, i.e., the fiber bundles 36 take the form of complex paths of the tubular cavities 18. Then, the resin which is injected together with the fiber bundles 36 is set so that the form of the fiber bundles 36 is fixed by the resin.

Thus, the manufacturing tool 52 is used as form to form the fiber reinforcement structure.

The form can be chosen such that the loads in the composite truss structure 42 are oriented as needed.

According to preferred embodiments, not only load carrying reinforcement by using carbon fiber bundles can be integrated, but also functional fibers. Hence, in at least one of the tubular cavities 18, functional fibers such as glass fibers that can be used to form a thermal and/or strain gauge or ceramic fibers that can be used to form an actuator are injected.

The second step S2 can also include a setting of the resin. For achieving this, the manufacturing tool 52 with the injected fiber bundles 36 as well as the resin can be put in an oven (not shown) for curing the thermosetting resin. After the second step S2 a structure shown in FIGS. 9 and 10 is obtained.

FIGS. 9 and 10 show the manufacturing tool 52 containing the injected fiber bundles 36. This manufacturing tool 52 is then put into a bath (not shown) with the solvent in order to remove the second polymer material 26 by dissolving it. Such a bath is an example for a dissolving device for dissolving the second material 26.

Hence, the dissolution of the second polymer material 26 using a specific solvent is one preferred embodiment of the third step S3. The third step S3 may also include other technologies to remove the second material such as subtractive technologies. Especially, the second polymer material 26 can be handled similar to a sacrificial material as known in the semi-conductor component manufacturing.

After removal of the second material 26, the part 10 is achieved as shown in FIGS. 11 to 13. In this particular embodiment, the part 10 is formed as a composite truss structure 42 with the first polymer material 22 forming junction areas 40 and/or curvature areas while the fiber bundle 36 is fixed by the resin function as truss struts.

As visible from FIGS. 11 to 13, the metallic member 44 can be used as a fixation means to fix the composite truss structure 42 to other components.

Especially, the part 10 achieved with the manufacturing method of FIG. 1 can be used for lightweight structure parts of air carrier or space carriers or other vehicles, such as manned or unmanned aircrafts or satellites.

In order to achieve a composite material part 10 with a fully load adapted 3D fiber reinforcement with low costs for tools and process, the invention provides a manufacturing method for manufacturing a part 10 made of composite material 12 with a continuous fiber reinforcement 14, the method comprising the steps:
a) providing a body 16 with tubular cavities 18 and having at least one first portion 20 made from a first polymer material 22 and at least one second portion 24 made from a second polymer material 26;
b) introducing resin and continuous fibers 28 into the tubular cavities 18,
c) removing at least a part of the second polymer material 26.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 part
12 composite material
14 continuous fiber reinforcement
16 body
18 tubular cavity
20 first portion
22 first polymer material
24 second portion
26 second polymer material
28 continuous fiber
30 first open end
32 second open end
36 fiber bundle
40 junction area
42 composite truss structure
44 metallic member
46 openings
48 protruding portions
50 recessed portions
52 manufacturing tool (e.g. body 16 and metallic member 44)
S1 Providing body with first and second portions, made from first and second materials, respectively
S1a geometrically designing of fiber reinforcement and the first and second portions
S1b manufacturing the body using additive layer manufacturing
S1c manufacturing a metallic member
S1d preassembling different parts of the body or of the body and a further member
S2 Introducing resin and continuous fibers into tubular cavities of body
S3 Removing the at least one second portion

The invention claimed is:

1. A manufacturing method for manufacturing a part made of composite material with a continuous fiber reinforcement, the method comprising the steps:
a) providing a body with tubular cavities and having at least one first portion made from a first polymer material and at least one second portion made from a second polymer material, wherein the body comprises at least 60%, by weight, of the second polymer material, and wherein the second portion forms at least a portion of walls of the tubular cavities;
b) introducing resin and continuous fibers into the tubular cavities; and
c) at least partially removing the second polymer material; wherein step a) comprises:
a1) selecting the second polymer material from materials that are soluble in a solvent and the first polymer material from polymer materials that are non-soluble in the solvent; and
wherein step c) comprises:
c1) dissolving the second polymer material in the solvent.

2. The manufacturing method according to claim 1, wherein step a) comprises at least one of the following steps:
a2) additive layer manufacturing of the body;
a3) forming the body with first portions defining open ends of the tubular cavities;
a4) forming the body with first portions defining curvature portions of the tubular cavities;
a5) forming the body with first portions defining junction areas of the continuous fiber reinforcement;
a6) forming the body with the at least one second portion defining middle sections of the tubular cavities;
a7) forming the body with the at least one second portion defining straight sections of the tubular cavities;
a8) forming the body with a larger amount of second material and a smaller amount of first material;
a9) forming the body with several first portions spaced apart from each other and connected by at least one second portion;
a10) forming the body such that the at least one tubular cavity subsequently passes through the at least one first portion and the at least one second portion;
a11) at least one of adding or connecting a metallic member to the body such that the metallic member has openings in alignment with open ends of the tubular cavities.

3. The manufacturing method according to claim 1, wherein step b) comprises at least one or several of the following steps:
b1) introducing resin in a liquid state and a continuous fiber bundle simultaneously,
b2) introducing a continuous fiber bundle within said at least one tubular cavity exerting on the continuous fibers a viscous drag force by means of a pressurized fluid or the resin, applying pressure differential;
b3) introducing a continuous fiber bundle within said at least one tubular cavity exerting a mechanical pushing force on the bundle of continuous fibers;
b4) introducing the resin and the continuous fibers sequentially, especially first the continuous fibers and subsequently the resin in a liquid state;
b5) introducing reinforcing fibers;
b6) introducing functional fibers;
b7) introducing glass fibers for forming at least one of a thermal or strain gauge;
b8) introducing ceramic fibers for forming at least one actuator;
b9) curing the resin after introducing the resin and continuous fibers into the tubular cavities.

4. The manufacturing method according to claim 3, wherein the reinforcing fibers comprise carbon fibers.

5. The manufacturing method according to claim 3, wherein the reinforcing fibers comprise a carbon fiber bundle.

6. The manufacturing method according to claim 3, wherein the functional fibers comprise glass fibers.

7. The manufacturing method according to claim 3, wherein the functional fibers comprise ceramic fibers.

8. The manufacturing method according to claim 1, wherein step c) comprises at least one or several of the following steps:

c2) removing the at least one second portion;
c3) removing all the second polymer material from the body;
c4) removing a connecting section or connection sections of the body connecting at least two of the first portions so that the first portions are spaced apart from each other.

\* \* \* \* \*